Figure 1:
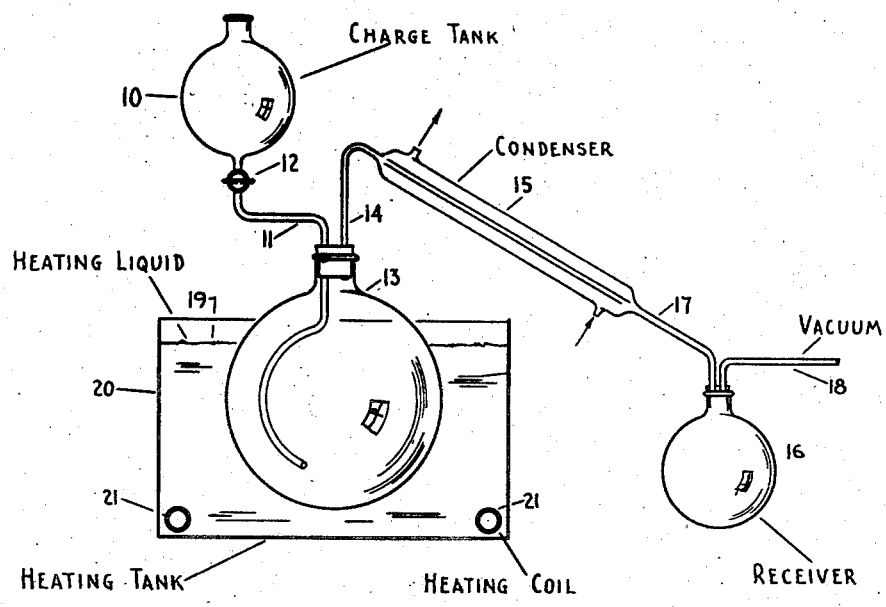

Nov. 9, 1948.   W. S. EMERSON ET AL   2,453,423
FLASH DISTILLATION OF ACETOPHENONE
FROM BENZOIC ACID
Filed March 3, 1945

WILLIAM S. EMERSON
VICTOR E. LUCAS  INVENTORS

BY

Patented Nov. 9, 1948

2,453,423

UNITED STATES PATENT OFFICE 2,453,423

FLASH DISTILLATION OF ACETOPHENONE FROM BENZOIC ACID

William S. Emerson and Victor E. Lucas, Dayton, Ohio, assignors to Monsanto Chemical Company, St. Louis, Mo., a corporation of Delaware Application March 3, 1945, Serial No. 580,928

4 Claims. (Cl. 202—39)

1

The present invention deals with the separation of benzoic acid from acetophenone, and particularly with the separation of benzoic acid from the oxidation products of ethylbenzene.

These and other objects which will be hereinafter disclosed are provided by the following invention, wherein the crude reaction mixture, obtained from the liquid phase oxidation of ethylbenzene after it has been filtered free of catalyst, is subjected to an equilibrium flash vaporization.

Several methods are available for carrying out a satisfactory separation according to the present invention. The simplest method and that which is useful for treating small quantities of materials is to drop the liquid into a heated evacuated still pot, the temperature of the pot and the rate of feed being adjusted to such a value that the acetophenone and methylphenylcarbinol are volatilized completely from the pot and removed therefrom without rectification, while the benzoic acid and tar remain therein. The temperature of the pot is adjusted to a point between the boiling point of benzoic acid and the boiling point of the acetophenone and carbinol at the reduced pressure prevailing in the pot. That is, the temperature is high enough to volatilize acetophenone and carbinol, but still low enough so that the benzoic acid and tar remain in the pot substantially unvolatilized.

The rate of feed of the liquid oxidation product to the pot is regulated by the rate at which heat is transferred into the pot so that the flow of material, if cooler than the pot, is not so rapid that the temperature of the pot is unduly lowered below the flashing temperature, nor is it so low that the temperature is raised (by the absence of sufficient volatilizable material) to a temperature above the boiling temperature of benzoic acid at the pressure prevailing in the pot. We have found, however, that if the still pot is maintained at a temperature between the range of from 60° C. to 225° C. at pressures of from 1 mm. to 500 mm. of mercury, the lower pressure corresponding to the lower temperature and the higher pressure corresponding to the higher temperature, satisfactory separation of the constituents may be effected.

Another method which may be utilized to separate the constituents of the oxidized mixture according to our invention is to heat the liquid while flowing in a tube or coil, which is connected to a vaporization chamber. The vaporization chamber. The vaporization chamber and the heating coil connected thereto are maintained under the desired reduced pressure (the chamber being under a somewhat lower pressure) and the heated liquid upon reaching the vaporization chamber flashes into vapor and is conducted out of the chamber. Benzoic acid and the tar which is not vaporized are removed as a liquid from the chamber.

The vaporization taking place according to either method described above is equilibrium vaporization, that is, the vapor is not allowed to separate from the unvaporized liquid until the finally desired temperature is reached. The two phases are kept in contact and hence are in substantial equilibrium at the time vaporization occurs. This condition is realized most perfectly by the latter method of operation. However, it is also realized by the first method of working, mentioned above. The latter method is sometimes used for distilling petroleum products and has in that art been referred to as equilibrium flash vaporization. Apparatus and the method suitable for carrying out this type of flash distillation are described by Nelson on page 61 of his book "Petroleum Refinery Engineering" published by McGraw-Hill Book Company, New York, 1941.

Our invention will be readily understood by reference to the accompanying drawing, the two figures of which illustrate two types of apparatus suitable for carrying out the process.

Referring to Fig. 1, numeral 10 indicates a charge tank connected by pipe 11 and containing valve 12 with distillation flask 13. Vapor pipe 14 leads from distillation flask 13 to a condenser which in turn connects with receiver 16 by means of pipe 17. Vacuum line 18 is connected to a source of vacuum permitting the process to be carried out under diminished pressure. Flask 13 is surrounded by a heating liquid 19 contained in tank 20. A source of heat such as an electrical heating element represented by 21 is immersed in liquid 19.

Figure 2:
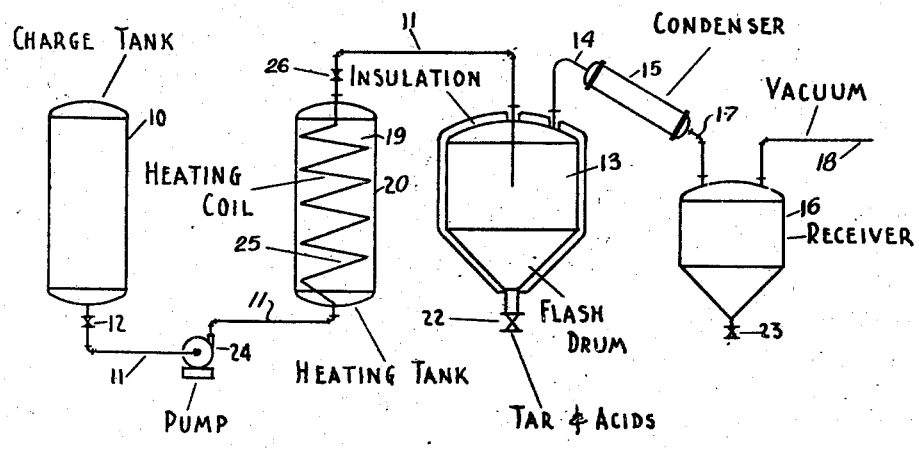

Referring to Fig. 2, numeral 10 indicates a charge tank connected by pipe 11 containing valves 12 and 26, pump 24 and heating coil 25 to flash drum 13. Heating coil 25 is contained in tank 20 and may be filled with a heat transfer fluid 19. Flash drum 13 is provided with a bottom outlet 22 and a vapor outlet 14, the latter being connected to condenser 15 by means of pipe 17. Pipe 17 is connected to receiver 16, which is also provided with a bottom outlet 23. A vacuum connection 18 is provided on receiver 16 for the purpose of applying a vacuum to the system.

In the operation of our process, utilizing the apparatus shown in Fig. 1, the liquid oxidation mixture is introduced into charge tank 10 and by means of valve 12 and pipe 11 caused to flow at a slow, steady rate into flask 13. The flask is heated to 120° C. by means of heating bath 19 and heating coil 21. The vaporized products pass out of flask 13 by means of tube 14, thereupon passed to condenser 15, wherein they are condensed and cooled and then flow by means of pipe 17 into receiver 16. During this process, the distillation system is maintained at a pressure of 16 to 17 mm. of Hg. The produce is collected in receiver 16, which the tars and benzoic acid are retained in flask 13. When appreciable quantities of tars and benzoic acid have accumulated in flask 13, the operation is interrupted and the residue in flask 13 removed.

When utilizing the apparatus shown in Fig. 2, the material to be distilled contained in charge tank 10 flows through pipe 11 and by means of pump 24 is forced through pipe 11, heating coil 25 and into flash drum 13. During its flow through heating coil 25 it is heated by means of heat transfer liquid 19 contained in tank 20. Valves 12 and 26 are provided for control of the flow of liquid in pipe 11. Vapors formed in flash drum 13 pass into pipe 14, condenser 16 and the liquid condensate formed in condenser 15 then flows by pipe 17 into receiver 16. The flash distillation is carried out under a vacuum applied to the receiver 16 and flash drum 13 by means of a vacuum source not shown which is connected to pipe 18. The product is collected in receiver 16, from which it may be withdrawn from time to time by means of valve 23. The tars and acids are withdrawn from flash drum 13 by means of valve 22.

When acetophenone is produced by the liquid phase catalytic oxidation of ethylbenzene one usually obtains a mixture consisting principally of unreacted ethylbenzene, acetophenone, benzoic acid and methylphenylcarbinol. The mixture may also contain more or less tar which is believed to be formed during oxidation by the reaction of benzoic acid upon acetophenone or methylphenylcarbinol, or other condensation reactions.

The present invention broadly provides an improved method for the separation of benzoic acid from acetophenone. It also provides a method for the separation of benzoic acid from the oxidation mixture obtained by the liquid phase oxidation of ethylbenzene in the presence of catalysts of oxidation. Such a mixture usually contains methylphenylcarbinol in addition to acetophenone.

In the past, the most frequently employed method for the separation of benzoic acid from the oxidation mixture consisted in treating the oxidation mixture with an aqueous solution of alkali such as sodium hydroxide or carbonate. In carrying out this method the oxidation mixture containing benzoic acid was agitated with the aqueous alkali solution until the benzoic acid was converted to the alkali metal salt and became dissolved in the aqueous layer. When this process is carried out it has been found that the organic layer forms an emulsion with the aqueous layer of such stability that it resists breaking by the usual methods employed for such purpose. Consequently, large quantities of material are retained in the operation by the step of separating the aqueous and organic layers. The emulsion formed is apparently stabilized by the presence of the sodium benzoate and prevents the ready separation of emulsified organic material and water.

Another method which is ordinarily considered suitable for separations of the type here involved, namely, fractional distillation, has been tried; however, we have found that this method causes an increased amount of tar to be formed by the reaction of benzoic acid with the acetophenone or carbinol during the heating incident to such distillation.

Still another possible method available for the separation of benzoic acid from acetophenone involves a treatment of the oxidation mixture containing these compounds with dry lime and a subsequent removal of the solid calcium benzoate and excess lime by filtration. While it is possible thereby to obtain a separation of acetophenone by such a method the amount of residue, principally tar, produced by this process is inordinately high.

In view of the difficulties hitherto encountered, an object of the invention is the provision of an efficient and convenient method for removing benzoic acid from the crude reaction product obtained by the liquid phase oxidation of ethylbenzene. Another object of the invention is the recovery of a substantially benzoic acid-free mixture of acetophenone, methylphenylcarbinol and ethylbenzene from mixtures consisting of these three compounds and benzoic acid.

The invention is further illustrated, but not limited, by the following examples:

*Example 1*

A mixture obtained by the oxidation of ethylbenzene in the liquid phase and consisting of between 42.7% to 43.2% by weight of acetophenone, between 0.8% to 1.3% of methylphenylcarbinol, about 3.3% of benzoic acid, approximately 1.9% of tar, the remainder being ethylbenzene was treated for removal of the benzoic acid and the tar using the following procedure:

A 500 cc. Claisen flask, fitted with a dropping funnel and an exit tube leading from a point above the bottom of the dropping funnel was evacuated to a pressure of from 16 to 17 mm. of mercury. A cooled suction flask, connected to a vacuum source, served as a receiver, the exit tube leading into the suction flask through a rubber stopper.

The temperature of the Claisen flask was brought to about 120° C. by means of an oil bath and the oxidation mixture described above was then slowly dropped into the evacuated, heated flask by means of the dropping funnel. The rate of addition was such as to permit no accumulation of liquid constituents other than benzoic acid and tar in the flask, and working in this manner 300 g. of the oxidation mixture was added during a period of 30 minutes. Addition of the mixture was thus made substantially at the rate at which volatilization and subsequent condensation of the desired products occurred.

Analysis of the condensate showed it to be free of tar and acid, the condensate consisting of approximately 55.3% by weight of ethylbenzene and approximately 44.7% of a mixture of acetophenone and methylphenylcarbinol, the carbinol content of said mixture being between 2% and 3% by weight.

The amount of benzoic acid and tar which remained in the Claisen flask was equal to 5.8% of the initial oxidation mixture. Since the original total tar and acid content was 5.2%, the flash distillation process of this example obviously resulted in only very low conversion of the desired products into tar.

Employing various methods for separation of benzoic acid from the oxidation mixture described above, the following results with respect to change in total tar and acid content were obtained:

| Treatment Used | Total Tar and Acid Content, Percent Weight Before Treatment | Amount of Residue, Recovered Percent Based on Original Material |
| --- | --- | --- |
| Flash distillation as described above | 5.2 | 5.8 |
| Vacuum fractionation, 80-14 mm. Hg | 5.2 | 10.0 |
| Treatment with lime, 200% of theory, agitation for 15 min. followed by fractional distillation | 5.2 | 15.54 |

The above data illustrate that the present method gives results, with respect to total tar and acid content, which corresponds to those obtained by washing with aqueous caustic, which procedure, however, is complicated due to the emulsion problems which it presents, as mentioned above. The present method is definitely superior, in respect to total tar and acid content, to either vacuum distillation or treatment with lime in absence of water.

*Example 2*

A solution comprising 300 grams of a mixture containing 10% of benzoic acid, 50% of acetophenone and 40% of ethylbenzene was heated to a temperature in the neighborhood of 100° C. and then flowed slowly into a flask heated in an oil bath to 225° C. while maintained under a reduced pressure of about 450-500 mm. The residue in the flask consisted of a benzoic acid containing residue amounting to 11.4% of the original mixture. The flash distilled vapors, upon condensation without fractionation, consisted of a mixture of acetophenone and ethylbenzene containing only a trace of benzoic acid.

*Example 3*

A liquid oxidation mixture obtained by the air oxidation of ethylbenzene, which mixture contained 2.0% tar, 3% of benzoic acid 45% of acetophenone, 15% methylphenylcarbinol, and the balance, ethylbenzene, was filtered free of oxidation catalyst and then subjected to flash distillation. A pipe still, such as is shown diagrammatically on page 465 of Transactions American Institute of Chemical Engineers for 1943, is utilized. The heating coil thereof is externally heated to a temperature of 190° C., the flash drum heated to the same temperature and a vacuum corresponding to a pressure of 300 mm. of mercury applied to the condenser and to the flash drum.

The liquid mixture is pumped into the coil at such a rate that the temperature of the liquid entering the drum is close to the temperature of the coil. The rate of flow of the liquid through the coil is regulated by means of a valve in the coil so that the liquid attains the temperature desired and at the same time is maintained largely in the liquid phase.

The heated liquid, upon entering the drum, is flashed into vapor, which is then condensed by means of the condenser attached to the drum and recovered as a benzoic acid-free condensate. The liquid residue consisting principally of benzoic acid and tar, together with a small amount of acetophenone, is withdrawn from the lower part of the drum. The process may be operated continuously and an almost quantitative separation of benzoic acid and tar from acetophenone obtained. The present process is generally useful for separating benzoic acid and acetophenone from mixtures containing the same however obtained. Where such mixtures are obtained by the liquid phase oxidation of ethylbenzene, the mixture to be separated generally contains a considerable quantity of ethylbenzene which acts as a solvent and is volatilized together with acetophenone. However, mixtures of benzoic acid and acetophenone containing other solvents may also be treated by the herein described process. Suitable solvents are any organic liquids which have a boiling point below that of benzoic acid.

What we claim is:

1. The process which comprises heating a mixture of acetophenone and benzoic acid dissolved in a solvent to a temperature above 60° C. but below 225° C. and flash vaporizing without rectification the acetophenone from said mixture.

2. The process which comprises heating a mixture of acetophenone and benzoic acid dissolved in ethylbenzene to a temperature above 60° C. but below 225° C. and flash vaporizing without rectification the acetophenone from said mixture.

3. The process which comprises heating a mixture of acetophenone and benzoic acid dissolved in a solvent having a boiling point below that of benzoic acid to a temperature above 60° C. but below 225° C. and then subjecting said mixture to an equilibrium flash vaporization without rectification, whereby acetophenone and said solvent are recovered as a substantially acid-free product.

4. The process which comprises heating a mixture of acetophenone, benzoic acid and tar dissolved in ethylbenzene to a temperature above 60° C. but below 225° C. and then subjecting said mixture to an equilibrium flash vaporization without rectification, whereby acetophenone and ethylbenzene are recovered as a substantially benzoic acid and tar-free product.

WILLIAM S. EMERSON.
VICTOR E. LUCAS.

REFERENCES CITED

The following references are of record in the file of this patent:

UNITED STATES PATENTS

| Number | Name | Date |
| --- | --- | --- |
| 1,813,606 | Binapfl | July 7, 1931 |
| 2,143,345 | Frankel et al. | Jan. 10, 1939 |
| 2,278,543 | French | Apr. 7, 1942 |
| 2,336,493 | Marks | Dec. 14, 1943 |
| 2,376,674 | Emerson et al. | May 22, 1945 |

OTHER REFERENCES

Fuson and Snyder, Organic Chemistry published 1942 by John Wiley and Sons, New York, New York copy in Library of Congress page 40.